United States Patent
Chen et al.

(10) Patent No.: US 9,671,895 B2
(45) Date of Patent: Jun. 6, 2017

(54) METHOD AND SYSTEM FOR TURNING OFF AN ALARM OF A MOBILE TERMINAL

(71) Applicant: HUIZHOU TCL MOBILE COMMUNICATION CO., LTD., Huizhou (CN)

(72) Inventors: Jianqiang Chen, Huizhou (CN); Feifei Chai, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/419,161

(22) PCT Filed: Aug. 12, 2013

(86) PCT No.: PCT/CN2013/081265
§ 371 (c)(1),
(2) Date: Feb. 2, 2015

(87) PCT Pub. No.: WO2014/134901
PCT Pub. Date: Sep. 12, 2014

(65) Prior Publication Data
US 2015/0177902 A1    Jun. 25, 2015

(30) Foreign Application Priority Data
Mar. 6, 2013  (CN) .......................... 2013 1 0070954

(51) Int. Cl.
*G06F 3/041* (2006.01)
*H04M 1/725* (2006.01)
(Continued)

(52) U.S. Cl.
CPC .......... *G06F 3/0416* (2013.01); *G06F 3/0488* (2013.01); *G06F 3/04847* (2013.01);
(Continued)

(58) Field of Classification Search
CPC .. G06F 3/0416; G06F 3/0488; G06F 3/04847; H04M 1/72519; H04M 19/04; H04M 2250/22
See application file for complete search history.

(56) References Cited

U.S. PATENT DOCUMENTS 5,933,152 A *  8/1999  Naruki ................. A63F 13/005
                                                  345/501
8,560,020 B2 * 10/2013  Lee ..................... H04M 1/0245
                                                  455/566
(Continued)

FOREIGN PATENT DOCUMENTS

CN    101883173 A    11/2010
CN    102006367 A     4/2011
(Continued)

*Primary Examiner* — Andrew Sasinowski
*Assistant Examiner* — Gerald Oliver
(74) *Attorney, Agent, or Firm* — Shimokaji IP

(57) ABSTRACT

A method and system for turning off an alarm of a mobile terminal, by presetting an area threshold value, includes automatically turning on the mobile terminal's screen when the alarm of the mobile terminal sets off and detecting if a touch signal is inputted. When a touch signal is inputted, calculating an area of a valid touch region in which a user touches the touchscreen and comparing the calculated area of the valid touch region with the area threshold value. If the area of the valid touch region is greater than or equal to the area threshold value, controlling the mobile terminal to turn off the alarm. If the area of the valid touch region is smaller than the area threshold value, the alarm of the mobile terminal keeps ringing.

15 Claims, 1 Drawing Sheet

(51) Int. Cl.
*H04M 19/04* (2006.01)
*G06F 3/0488* (2013.01)
*G06F 3/0484* (2013.01)

(52) U.S. Cl.
CPC ....... *H04M 1/72519* (2013.01); *H04M 19/04* (2013.01); *H04M 2250/22* (2013.01)

(56) References Cited

U.S. PATENT DOCUMENTS

| | | | | |
|---|---|---|---|---|
| 2009/0167717 | A1* | 7/2009 | Wang | G06F 3/0416 345/173 |
| 2010/0020026 | A1* | 1/2010 | Benko | G06F 3/041 345/173 |
| 2011/0273267 | A1 | 11/2011 | Bong | |
| 2012/0013562 | A1* | 1/2012 | Jyonoshita | G06F 3/0416 345/173 |
| 2013/0106756 | A1* | 5/2013 | Kono | G06F 1/3215 345/173 |
| 2013/0135259 | A1* | 5/2013 | King | G06F 3/0421 345/175 |
| 2013/0159927 | A1* | 6/2013 | Chuang | G06F 3/0488 715/810 |
| 2013/0169572 | A1* | 7/2013 | Zhou | G06F 3/0488 345/173 |

FOREIGN PATENT DOCUMENTS

| | | |
|---|---|---|
| CN | 102647518 A | 8/2012 |
| CN | 103152484 A | 6/2013 |

\* cited by examiner

METHOD AND SYSTEM FOR TURNING OFF AN ALARM OF A MOBILE TERMINAL

TECHNICAL FIELD

The present disclosure relates to the field of mobile terminals and, in particular, to a method and system for turning off an alarm of a mobile terminal.

BACKGROUND

An alarm reminder (e.g., a wakeup alarm) is a basic function of mobile phones. When an alarm sets off on weekends, or days off, due to failure to cancel the alarm setting, or when you still have time to sleep for a little bit longer and yet the alarm still keeps on ringing on time the alarm can be annoying. According to the conventional way to turn off an alarm, a user of an associated mobile phone has to turn on the mobile phone, and then turn off the alarm by performing specific operations in a designated region of an operator interface of the mobile phone, such as sliding a switch horizontally, sliding a switch in a curve motion, etc. In a sleepy state, however, it usually takes a user a lot of time and effort to complete such operations. The alarm is usually turned off only after many attempts, which disrupts the user's sleep. When a user is awakened by an alarm in the morning but wants to go back to sleep, it is very likely that the alarm could not be successfully turned off after many times of trying.

Therefore, the prior art is in need of improvement and development.

SUMMARY

The technical problem that the present invention intends to solve is, in light of the above drawbacks of the prior art, to provide a method and system for turning off the alarm of a mobile terminal, thereby solving the problem of inconvenient operation to turn off a ringing alarm of a mobile terminal according to the prior art.

To solve the technical problem, the present invention employs the following technical solution:

A method for turning off an alarm of a mobile terminal includes presetting an area threshold value; automatically turning on a mobile terminal's touchscreen when the alarm of the mobile terminal sets off; detecting a touch signal, when a touch signal is detected, calculating an area of a valid touch region in which a user touches the touchscreen; comparing the calculated area of the valid touch region with the area threshold value, if the area of the valid touch region is greater than or equal to the area threshold value, controlling the mobile terminal to turn off the alarm; and if the area of the valid touch region is smaller than the area threshold value, the alarm of the mobile terminal keeps ringing.

In another embodiment, a method for turning off an alarm of a mobile terminal includes, when a touchscreen of the mobile terminal is turned on, detecting a touch signal for a preset time interval.

In a further embodiment, a method for turning off an alarm of a mobile terminal includes pre-storing a plurality of graphics.

In yet another embodiment, a method for turning off an alarm of a mobile terminal includes dividing a valid touch region, in which a user touches the touchscreen, into a plurality of graphics according to pre-stored graphics, calculating an area of each graphic, adding the areas of each graphic to produce an area sum, and calculating the area of the valid touch region based on the area sum.

In yet a further embodiment, a method for turning off an alarm of a mobile terminal includes graphics that include at least one of: a rectangle, a circle, or a triangle.

In another embodiment, a system for turning off an alarm of a mobile terminal includes a storage module for storing a preset area threshold value; a detection module for detecting a touch signal; a calculation module for calculating an area of a valid touch region in which a user touches a touchscreen; a comparison module for comparing the area of the valid touch region with the area threshold value; and an alarm control module for controlling the alarm according to a comparison result of the comparison module, wherein when the area of the valid touch region is greater than or equal to the area threshold value, controlling the mobile terminal to turn off the alarm, and wherein when the area of the valid touch region is smaller than the area threshold value, the alarm of the mobile terminal keeps ringing.

In yet another embodiment, a system for turning off an alarm of a mobile terminal includes an interrupt module for sending an interrupt signal to a detection module at a preset time interval so that the detection module detects a touch signal for the preset time interval.

In a further embodiment, a system for turning off an alarm of a mobile terminal includes storing a plurality of graphics.

In yet a further embodiment, a system for turning off an alarm of a mobile terminal includes a mobile terminal that is a mobile phone or tablet computer, having a touchscreen.

A method and system for turning off an alarm of a mobile terminal is provided, which effectively solves a problem associated with inconvenient operation to turn off a ringing alarm of a mobile terminal. The methods and systems automatically turn on a mobile terminal touchscreen when the alarm of the mobile terminal sets off; detect a touch signal, and when a touch signal is detected, calculate an area of a valid touch region in which a user touches the touchscreen, wherein when the area of the valid touch region is greater than or equal to the area threshold value, control the mobile terminal to turn off the alarm. The operation method of the present disclosure is simple for a user of a mobile terminal to implement, which enables the user to turn off an alarm without accurate operations and without opening the user's eyes. The operations associated with the methods of turning off a mobile terminal alarm of the present disclosure do not have to be very accurate relative to known methods. A user of a mobile device according to the present disclosure may, for example, use a palm to pat or touch a large area of the mobile phone surface, and the alarm stops right away. Thereby, the method of turning off a mobile terminal alarm of the present disclosure is rapid and effective. The method of turning off a mobile terminal alarm of the present disclosure can be implemented via software, and the cost is relatively low compared to known methods.

DETAILED DESCRIPTION

A method and system for turning off an alarm of a mobile terminal (e.g., a mobile telephone or a tablet computer) are provided. The method and systems are further described in detail below with reference to the accompanying drawings and various specific embodiments. It should be understood that the specific embodiments described herein are included to explain the present invention and are not intended to limit the present invention in any way.

Figure 1:
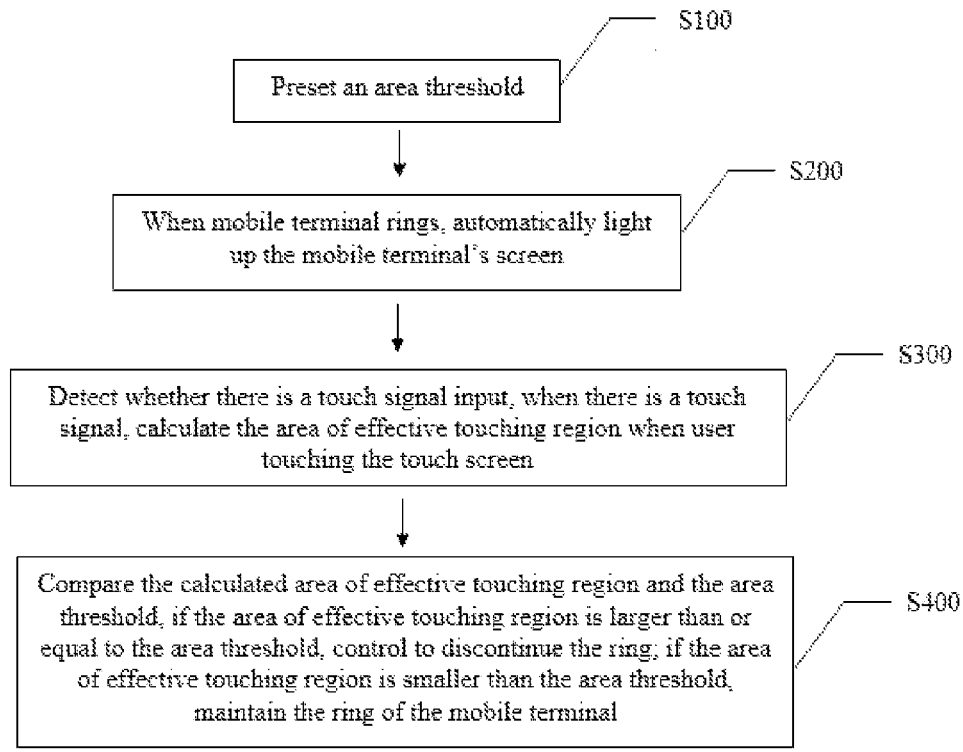
FIG. 1 depicts a flow chart of a method for turning off an alarm of a mobile terminal according to the present invention.

Referring to FIG. 1, a flow chart of a method for turning off an alarm of a mobile terminal may include presetting an area threshold value (block S100). The method may further include automatically turning on a mobile terminal's touchscreen when an alarm of the mobile terminal sets off (block S200) and detecting a touch signal (block S300). When a touch signal is detected (block S300), calculating the area of a valid touch region in which a user touches a touchscreen (block S300). The method may also include comparing the calculated area of the valid touch region with the area threshold value (block S400). If the area of the valid touch region is greater than or equal to the area threshold value, the method may include controlling the mobile terminal to turn off the alarm (block S400). If the area of the valid touch region is smaller than the area threshold value, the alarm of the mobile terminal keeps ringing (block S400).

The above method of turning off an alarm of a mobile terminal will be described in detail below with reference to specific embodiments. An area threshold value S' may be preset (block S100). The value of the preset area threshold value S' may be set by performing an estimated setting according to a palm size of a user and/or a touchscreen size. For example, a preset area threshold value S' may be estimated based on a round region with a diameter of 4 cm in a palm center, accordingly, an area of a valid touch region may be approximately 12.56 $cm^2$, and an area threshold value S' may be set to 10~12 $cm^2$. When an alarm of a mobile terminal is detected to have been set off (block S200), a CPU of the mobile terminal may, for example, automatically turn on a mobile terminal touchscreen if a touch signal is detected, when a touchscreen is turned on (block S300), an area S of a valid touch region, in which a user touches the touchscreen may be calculated (block S300). When no touch signal is detected (block S300), the alarm of the mobile terminal may continue ringing. Specifically, a touchscreen of a mobile terminal may possess a function of identifying a large area contact, such as multi-touch. When the touchscreen is automatically turned on, a touch signal may be detected as a user touches the touchscreen in a large area, for example with a palm. In response to the user touching the touchscreen, the touchscreen may output valid touch region information. The valid touch region information may be representative of the touchscreen detecting the valid touch signal that may be in response to the user touching the touchscreen, i.e. the touch signal may be detected. Notably, as touchscreens are divided into capacitor panels and resistor panels and, due to inconsistent pressure under which a user's palm touches the touchscreen and other factors, small locations of a touchscreen that are touched may not necessarily produce touch signals. After an area S of a valid touch region, in which a user touches the touchscreen, is calculated, the calculated area S, of the valid touch region, may be compared with the area threshold value S' (block S400). If the area S, of the valid touch region, is greater than or equal to the area threshold value S', the mobile terminal may be controlled to turn off the alarm. If the area S of the valid touch region is smaller than the area threshold value S', the alarm of the mobile terminal may continue ringing.

A valid touch region, in which a user touches the touchscreen, may be represented by an irregular graphic, and the irregular graphic may be a graphic with an area that may not be reached using an area equation. Thus, to more accurately calculate the area S of the valid touch region, a plurality of graphics may be pre-stored (block S100). Specifically, a graphic may be a common graphic, i.e. a regular graphic, namely a graphic with an area that can be directly reached using an area equation, including a rectangle, a circle and/or a triangle. Thereby, the valid touch region information, regarding a user touching the touchscreen, may be divided into a plurality of graphics according to the pre-stored graphics. An area of each graphic may be calculated, and the areas of each of the graphics may be added to produce an area sum to obtain the area S of the valid touch region. In such a way, the calculation result of the area S of a valid touch region may be more accurate and closer to an actual contact area. For example, a rough graphic of a valid touch region, in which the user touches the touchscreen, can be determined first. The rough graphic may be, for example, a fuzzy graphic, which does not have to be accurate and can be a rectangle, a circle and/or a triangle. With the rough graphic of the valid touch region as an example, a pre-stored rectangle may be used to approximate a valid touch region in which the user touches the touchscreen. When a rectangle approaching a valid touch region is the biggest, i.e. when the rectangle will exceed the valid touch region if further increasing, a pre-stored graphic may be further used to approach other regions of the valid touch region than the rectangle. As a result, a valid touch region, in which the user touches the touchscreen, may be divided into a plurality of graphics, the area of each graphic may be calculated, and the areas of each graphic may be to produce an area sum, to obtain the area of the valid touch region. In such a way, calculation of an area of a valid touch region is simplified.

A preset time Δt, associated with a touch signal, may be set in advance (block S100). Thereby, when a touchscreen of a mobile terminal is turned on, a touch signal may be detected for the preset time interval Δt. Specifically, a touch signal may be detected over a preset time interval Δt, which may improve sensitivity in terms of touch response time.

Furthermore, to improve determination of touch signals when a user touches the touchscreen, a length of time that the user touches the touchscreen may be detected. If a length of time that the user touches the touchscreen exceeds the threshold time, the touch may be considered to be a valid touch. Once a user touch is determined to be a valid touch, the mobile terminal may proceed to an area calculation. While a touch not longer than the threshold time is not counted as a valid touch signal, a user experience may be improved. For example, a long touch by a user may indicate the user's willingness to turn off the alarm. If a user does not want to turn off an alarm, the user does not touch the touchscreen for the threshold time.

Figure 2:
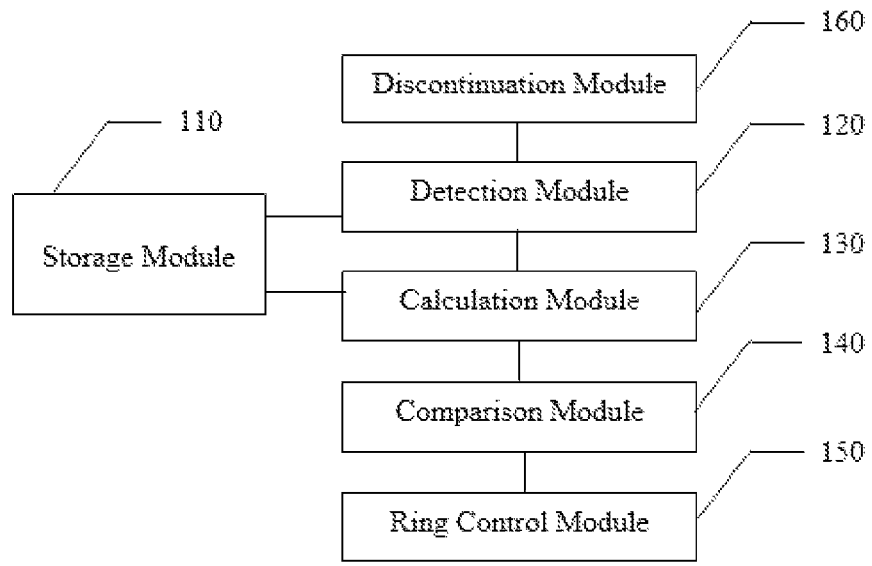
FIG. 2 depicts a block diagram of a structure of a system for turning off an alarm of a mobile terminal according to the present invention.

Based on the above method for turning off an alarm of a mobile terminal, a system for turning off the alarm of the mobile terminal, as shown in FIG. 2, may include a storage module 110 for storing a preset area threshold value. The mobile terminal may also include a detection module 120 for detecting a touch signal, a calculation module 130 for calculating an area of a valid touch region in which a user touches the touchscreen and a comparison module 140 for comparing the area of the valid touch region, in which a user touches the touchscreen, calculated by the calculation module 130, with the area threshold value.

The mobile terminal may further include an alarm control module 150 for controlling the alarm according to the comparison result of the comparison module 140. When the area of the valid touch region is greater than or equal to the area threshold value, the mobile terminal may be controlled to turn off the alarm. When the area of the valid touch region is smaller than the area threshold value, the alarm of the mobile terminal may continue ringing. The storage module 110, the detection module 120, the calculation module 130, the comparison module 140 and the alarm control module 150 may be connected sequentially.

With further reference to FIG. 2, the system for turning off the alarm of the mobile terminal may further include an interrupt module 160 connected to, for example, the detection module 120, and used for sending an interrupt signal to the detection module 120 at a preset time interval such that the detection module 120 checks if a touch signal is inputted. Furthermore, the storage module 110 may be further connected to the calculation module 130 and used for storing a plurality of graphics. Specifically, the interrupt module 160 may send an interrupt signal to the detection module 120 at a preset time interval Δt so that the detection module 120 checks if a touch signal is inputted. Upon receiving the interrupt signal, the detection module 120 may, for example, check if a touch signal is inputted If a touch signal is detected, the detection module 120 may transmit valid touch region information to the calculation module 130. The storage module 110 may further pre-store a plurality of graphics. Upon receiving the valid touch region information, the calculation module 130 may call graphics, stored by the storage module 110, to divide the valid touch region into a number of graphics, i.e. the calculation module 130 may use a plurality of graphics to approach the valid touch region. The calculation module 130 may calculate the area of each graphic, and output the total area value S, after addition of all areas of each of the graphics, to the comparison module 140. Upon receiving the total area S, transmitted from the calculation module 130, the comparison module 140 may compare the total area S with the area threshold value S' stored in the storage module 110. If S≥S' is satisfied, the the comparison module 140 may output a trigger signal to the alarm turning-off module 150. If S≥S' is not satisfied, the comparison module 140 may not output an alarm turning-off signal. Upon receiving the trigger signal transmitted from the comparison module 140, the alarm turning-off module 150 may control the associated mobile terminal to turn off the alarm; otherwise, the alarm turning-off module 150 may not perform the operation of turning off the alarm.

Furthermore, the system for turning off an alarm of a mobile terminal may further include a time determination module (not shown in FIG. 2), and the storage module 110 may further store a threshold time. The time determination module may be used for detecting if a time that a user touch of a touchscreen exceeds the threshold time. A user touch longer than the threshold time may be considered a valid touch, and the system may proceed to the next step of area calculation. A user touch not longer than the threshold time may not be counted as a valid touch signal. Thereby, a user experience may be improved, which may also indicate a user's willingness to turn off the alarm. If a user does not want to turn off the alarm, then the user does not touch the touchscreen for the threshold time.

Based on the above system for turning off an alarm of a mobile terminal, a mobile terminal may not be limited to a mobile phone or a tablet computer having a touchscreen. In fact, the system for turning off an alarm of a mobile terminal may be used on other mobile terminals.

In summary, a method and system for turning off an alarm of a mobile terminal may be provided by presetting an area threshold value; automatically turning on a mobile terminal's touchscreen when an alarm of the mobile terminal sets off; detecting a touch signal. When a touch signal is detected, an area of a valid touch region, in which a user touches the touchscreen, may be calculated. When no touch signal is detected, the alarm of the mobile terminal may continue ringing. The calculated area of the valid touch region may be compared with the area threshold value, and if the area of the valid touch region is greater than or equal to the area threshold value, the mobile terminal may be controlled to turn off the alarm. If the area of the valid touch region is smaller than the area threshold value, the alarm of the mobile terminal may continue ringing. The operation method of turning off an alarm of a mobile terminal of the present disclosure is simple for a user of the mobile terminal, which enables a user to turn off an alarm without accurate operations and without opening the user's eyes. The user operations associated with the methods and systems for turning off an alarm of a mobile terminal of the present disclosure do not have to be very accurate. A user may use a palm to pat or touch a large area of the mobile phone surface, and the alarm may stop right away. Thus, the methods and systems for turning off an alarm of a mobile terminal of the present disclosure may be rapid and effective. The implementation method may be simple for a user of a mobile terminal, which can be implemented via software, and the cost may be relatively low.

It should be understood that applications of the methods and systems for turning off an alarm of a mobile terminal of the present disclosure are not limited by the examples described above. To those skilled in the art, improvements or variations may be made according to the above description, and all of these improvements or variations shall be encompassed by the scope defined by the appended claims.

The invention claimed is:

1. A method for turning off an alarm of a mobile terminal, the method comprising:
presetting an area threshold value;
pre-storing graphics;
automatically turning on a mobile terminal's screen when the alarm of the mobile terminal sets off;
detecting a touch signal, when a touch signal is detected, calculating an area of a valid touch region in which a user touches the touchscreen, wherein the valid touch region is an irregularly shaped non-predetermined area of the mobile terminal's screen, and wherein an area equation cannot directly determine the irregularly shaped non-predetermined area;
wherein the valid touch region is divided into a plurality of graphics according to the pre-stored graphics;
wherein the calculating the area of the valid touch region comprises: calculating an area of each of the plurality of graphics, adding the area of each of the plurality of graphics together to produce an area sum, and calculating the area of the valid touch region based on the area sum;
comparing the calculated area of the valid touch region with the area threshold value to determine an intent of a user to turn off the alarm, if the area of the valid touch region is greater than or equal to the area threshold value, controlling the mobile terminal to turn off the alarm; and
if the area of the valid touch region is smaller than the area threshold value, the alarm of the mobile terminal keeps ringing, wherein the area threshold value is position independent.

2. The method as set forth in claim 1, wherein, when the screen of the mobile terminal is turned on, detecting a touch signal for a preset time interval.

3. The method as set forth in claim 1, wherein the graphics comprise at least one of: a rectangle, a circle or a triangle.

4. The method as set forth in claim 1, further comprising: presetting a threshold time and, when the user touches the touchscreen, detecting if the time the user touches the touchscreen exceeds the threshold time, wherein a user touch longer than the threshold time is determined to be a valid touch and the area of the valid touch region is calculated, and wherein a user touch that is not longer than the threshold time is determined to be an invalid touch signal.

5. The method as set forth in claim 4, further comprising: performing an estimated setting according to a palm size and a touchscreen size, and determining a value for presetting the area threshold value based on the palm size and the touchscreen size.

6. The method as set forth in claim 5, further comprising: pre-storing a plurality of graphics.

7. The method as set forth in claim 6, further comprising: dividing the valid touch region into a plurality of graphics according to the pre-stored graphics, calculating an area of each graphic and adding the areas of each graphic to produce an area sum, and calculating the area of the valid touch region based on the area sum.

8. The method as set forth in claim 6, wherein the graphics include at least one of: a rectangle, a circle, or a triangle.

9. The method as set forth in claim 4, wherein when the touchscreen of the mobile terminal is turned on, detecting if a touch signal is inputted for a preset time interval.

10. A method for turning off an alarm of a mobile terminal, the method comprising:
    performing an estimated setting according to a palm size and a touchscreen size, determining a value for presetting an area threshold value;
    automatically turning on a mobile terminal touchscreen when the alarm of the mobile terminal sets off;
    detecting a touch signal, when a touch signal is detected, calculating an area of a valid touch region in which a user touches the touchscreen, wherein the valid touch region is of an irregular shape of the mobile terminal touchscreen, and wherein an area equation cannot directly determine the area of the valid touch region having the irregular shape;
    dividing the valid touch region into a plurality of graphics according to pre-stored graphics, calculating an area of each graphic and adding the area of each graphic to produce an area sum, and calculating the area of the valid touch region based on the area sum;
    comparing the calculated area of the valid touch region with the area threshold value, if the area of the valid touch region is greater than or equal to the area threshold value, controlling the mobile terminal to turn off the alarm, wherein the calculated area is independent of a position on the touchscreen, and wherein controlling the mobile terminal to turn off the alarm comprises determining a user intent to turn off the alarm.

11. A system for turning off an alarm of a mobile terminal, the system comprising:
    a storage module for storing a preset area threshold value and graphics including at least one of a rectangle, a circle, and a triangle;
    a detection module for detecting a touch signal;
    a calculation module for calculating an area of a valid touch region, wherein the valid touch region is an irregular shape located in any non-predetermined area of a screen of the mobile terminal, wherein an area equation cannot directly determine the area of the valid touch region having the irregular shape, wherein the calculation module divides the valid touch region into a plurality of graphics according to the stored graphics, and wherein the calculation module calculates the area of the valid touch region by calculating an area of each of the plurality of graphics, adding the areas of each of the plurality of graphics to produce an area sum, and calculating the area of the valid touch region based on the area sum;
    a comparison module for comparing the area of the valid touch region with the area threshold value;
    an alarm control module for controlling the alarm according to a comparison result of the comparison module, wherein when the area of the valid touch region is greater than or equal to the area threshold value, controlling the mobile terminal to turn off the alarm, and wherein when the area of the valid touch region is smaller than the area threshold value, the alarm of the mobile terminal keeps ringing, wherein a comparison made by the comparison module is independent of the valid touch region, and provides indication of a user's intent to turn off the alarm.

12. The system as set forth in claim 11, further comprising: an interrupt module for sending an interrupt signal to the detection module at a preset time interval, wherein the detection module detects a touch signal for the present time interval.

13. The system as set forth in claim 11, wherein the mobile terminal is a mobile phone, or a tablet computer, having a touchscreen.

14. The system as set forth in claim 11, further comprising:
    performing an estimated setting according to a palm size and a touchscreen size, and determining a value for presetting the area threshold value based on the palm size and the touchscreen size.

15. The system as set forth in claim 11, wherein when the touchscreen of the mobile terminal is turned on, detecting a touch signal for a preset time interval.

* * * * *